United States Patent
Antoku et al.

(10) Patent No.: US 8,144,427 B2
(45) Date of Patent: Mar. 27, 2012

(54) MAGNETIC HEAD, HEAD ASSEMBLY AND MAGNETIC RECORDING/REPRODUCING APPARATUS

(75) Inventors: Yosuke Antoku, Tokyo (JP); Takeo Kagami, Tokyo (JP); Katsuki Kurihara, Tokyo (JP); Taro Oike, Tokyo (JP); Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 662 days.

(21) Appl. No.: 12/274,470

(22) Filed: Nov. 20, 2008

(65) Prior Publication Data
US 2010/0123966 A1    May 20, 2010

(51) Int. Cl.
G11B 5/10  (2006.01)
G11B 5/56  (2006.01)

(52) U.S. Cl. .............. 360/128; 360/125.31; 360/125.74; 360/234.4; 360/59; 360/294.4

(58) Field of Classification Search .................. None
See application file for complete search history.

(56) References Cited

U.S. PATENT DOCUMENTS

| | | | | |
|---|---|---|---|---|
| 7,164,555 B2 * | 1/2007 | Kato et al. | ..................... | 360/128 |
| 7,224,553 B2 * | 5/2007 | Sasaki et al. | .................. | 360/128 |
| 7,324,299 B1 | 1/2008 | Schreck et al. | | |
| 7,436,619 B2 * | 10/2008 | Takahashi | ....................... | 360/75 |
| 7,770,438 B2 * | 8/2010 | Kiyono et al. | .................. | 73/104 |
| 7,929,256 B2 * | 4/2011 | Yamashita et al. | ......... | 360/294.4 |
| 2003/0099054 A1 * | 5/2003 | Kamijima | ....................... | 360/59 |
| 2003/0174430 A1 * | 9/2003 | Takahashi et al. | ............... | 360/75 |
| 2005/0213250 A1 * | 9/2005 | Kurita et al. | ............... | 360/234.4 |

FOREIGN PATENT DOCUMENTS

| | | |
|---|---|---|
| JP | 10-64057 | 3/1998 |
| JP | 11-306514 | 11/1999 |
| JP | 2004-164797 | 6/2004 |
| JP | 2007-310978 | 11/2007 |
| JP | 2008-16158 | 1/2008 |
| JP | 2008-152834 | 7/2008 |

* cited by examiner

Primary Examiner — Kevin Bernatz
(74) Attorney, Agent, or Firm — Oblon, Spivak, McClelland, Maier & Neustadt, L.L.P.

(57) ABSTRACT

The present invention relates to a magnetic head, a head assembly, and a magnetic recording/reproducing apparatus which are capable of effectively detecting thermal asperity. The magnetic head according to the present invention includes a heat-generating resistor, a recording coil, and a resistive element. The heat-generating resistor is adapted to generate heat when power is fed thereto so that the heat generation causes at least a part of the air bearing surface to thermally expand and protrude. The recording coil is adapted to generate a recording magnetic field, and the resistive element is disposed closer to the air bearing surface than the recording coil and connected in series or in parallel with the heater. Thus, the resistive element can share a common wiring with the heater for power feeding, which eliminates the waste of wiring and achieves miniaturization.

11 Claims, 12 Drawing Sheets

MAGNETIC HEAD, HEAD ASSEMBLY AND MAGNETIC RECORDING/REPRODUCING APPARATUS

TECHNICAL FIELD

The present invention relates to a magnetic head, a head assembly, and a magnetic recording/reproducing apparatus.

BACKGROUND OF THE INVENTION

In the field of magnetic heads to be mounted on a magnetic recording/reproducing apparatus such as a hard disk drive (HDD), recently, the flying height of a magnetic head to be mounted has been dramatically decreased along with improvement in recording density, falling below 10 (nm). However, there is a problem that such a decrease in the flying height causes the phenomenon of generating frictional heat due to collision of the magnetic head against a ridge on the surface of a magnetic disk, so-called thermal asperity (hereinafter referred to as TA).

Occurrence of TA not only damages the magnetic head by collision but also adversely affects write signals and read signals because the resistance of a magneto-resistive effect element momentarily changes along with an increase in temperature due to frictional heat.

Concerning this problem, for example, Japanese Unexamined Patent Application Publication No. 2007-310978 discloses a technology of providing the magnetic head with a heater and controlling the flying height based on detected TA utilizing thermal expansion due to heating by the heater. However, since this technology is based on the premise that a TA detection circuit is disposed outside the magnetic head, the apparatus increases in size, which is not desirable from the viewpoint of miniaturization.

Accordingly, the magnetic head itself has been required to have the function of detecting TA and there has been developed a technology of utilizing the magneto-resistive effect element, which is the reproducing element, as the TA detection element. However, when using a recently prevailing TMR (tunnel magneto-resistance) element, there is a problem that since it has a low temperature coefficient, the change in resistance due to heat is too small to obtain desired detection sensitivity. With this technology, moreover, the reproducing element collides against a ridge of the magnetic disk, which is not desirable from the viewpoint of reliability.

On the other hand, for example, Japanese Unexamined Patent Application Publication No. 11-306514 discloses a technology of providing a TA detection element separately of the reproducing element. This technology is such that in the vicinity of a magneto-resistive effect element, a resistive element having a lower temperature coefficient than the above element is formed and electrically connected to the magneto-resistive effect element to compensate the change in signals due to TA or the like. However, this has a problem that there is a limit to selection of temperature coefficient.

SUMMARY OF THE INVENTION

It is an object of the present invention to provide a compact magnetic head, a head assembly, and a magnetic recording/reproducing apparatus which are capable of effectively detecting thermal asperity.

In order to solve the above problem, the magnetic head according to the present invention comprises a heat-generating resistor, a recording coil, and a resistive element and has an air bearing surface.

The heat-generating resistor is adapted to generate heat when power is fed thereto so that the heat generation causes at least a part of the air bearing surface to thermally expand and protrude.

The recording coil is adapted to generate a recording magnetic field, and the resistive element is disposed closer to the air bearing surface than the recording coil and connected in series or in parallel with the heat-generating resistor.

With this magnetic head, since the resistive element is disposed closer to the air bearing surface, which is to be opposed to a magnetic medium, than the recording coil, thermal asperity can be instantaneously and accurately detected at a position close to a position where collision against a ridge of the magnetic medium will occur. In addition, since the reproducing element is not used for detection, it has not only high reliability but also broad options for the material because there is no limit to the temperature coefficient of the resistive element.

Moreover, since the resistive element is connected in series or in parallel with the heat-generating resistor, power can be fed through a common wiring, which eliminates the waste of wiring and achieves miniaturization.

The present invention further discloses a head assembly and magnetic recording/reproducing apparatus. The head assembly includes the above magnetic head and a head support device. The head support device is adapted to support the magnetic head in such a manner as to permit rolling and pitching of the magnetic head. In the present invention, the head assembly includes an HGA (head gimbal assembly) in which the magnetic head is mounted on a head support device (gimbal) and an HAA (head arm assembly) in which the HGA is mounted on an arm.

The magnetic recording/reproducing apparatus according to the present invention includes the above head assembly and a magnetic recording medium. The head assembly is adapted to record information by applying a recording magnetic field to the magnetic recording medium and reproduce information from the magnetic recording medium. A typical example of the magnetic recording/reproducing apparatus is a hard disk drive (HDD) using a magnetic recording medium that is called hard disk.

The other objects, constructions and advantages of the present invention will be further detailed below with reference to the attached drawings. However, the attached drawings show only illustrative examples.

DESCRIPTION OF THE PREFERRED EMBODIMENTS

First will be described a magnetic head according to the present invention, then will be described a head assembly according to the present invention, and finally will be described a magnetic recording/reproducing apparatus according to the present invention.

1. Magnetic Head

Figure 1:
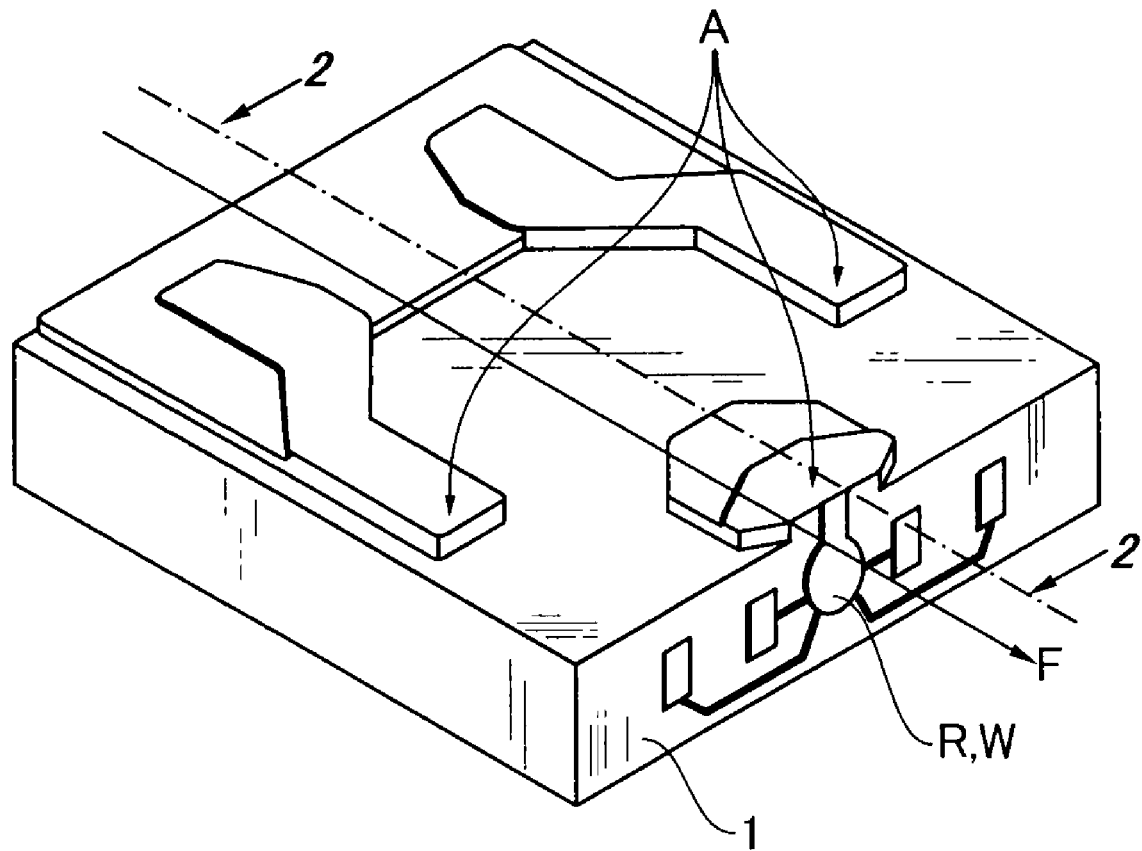
FIG. 1 is a perspective view of a magnetic head according to the present invention.

FIG. 1 shows a magnetic head to be used in combination with a rapidly spinning magnetic recording medium such as a hard disk. Magnetic heads of this type are generally called flying-type.

Referring first to FIG. 1, the magnetic head has a slider substrate 1 of a generally rectangular parallelepiped structure. The slider substrate 1 has an air bearing surface A directly relating to the flying characteristics and a recording/reproducing head (R,W) on a lateral end face located at the side of an air flow-out end with respect to an air flow direction F.

Figure 2:
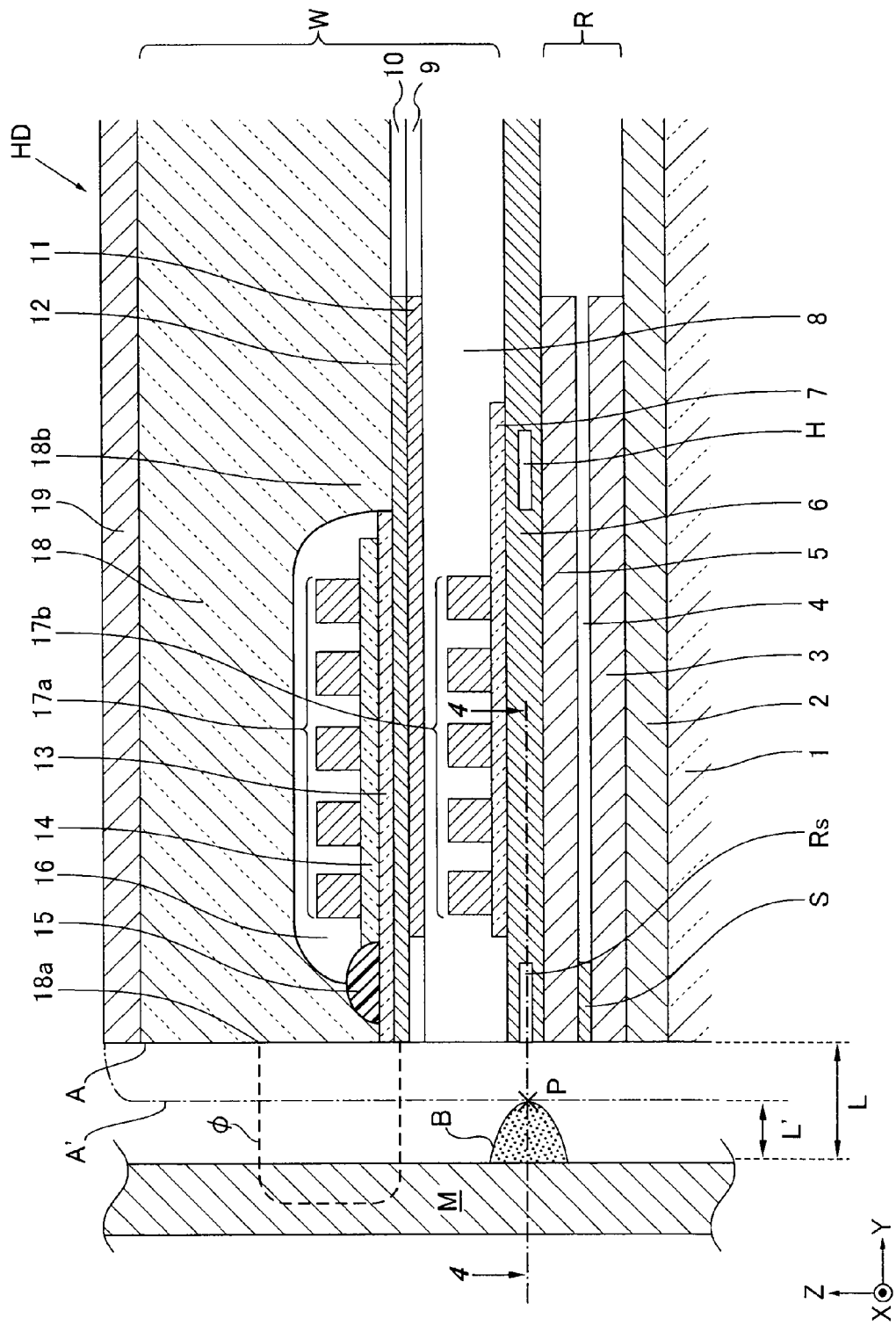
FIG. 2 is a section taken along line 2-2 in FIG. 1.

Details of the recording/reproducing head (R,W) are shown in FIG. 2. FIG. 2 is a section taken along line 2-2 in FIG. 1. It should be noted that for explanation, FIG. 2 shows a magnetic recording medium M that is not included in a magnetic head HD. In the following description, moreover, close and remote portions with respect to the air bearing surface A along the Y axis will be designated by "front" and "rear", respectively.

The magnetic head HD shown in FIG. 2 is a complex-type head that is capable of performing both recording and reproducing. In the magnetic head HD, a protective film 2, a reproducing head R using the magneto-resistive effect (MR), a separating film 9, a recording head W for performing a recording process in a perpendicular recording method, and a protective film 19 are stacked on the slider substrate 1 in the mentioned order. The recording head W can record information by applying a perpendicular recording magnetic field $\phi$ to the magnetic recording medium M, while the reproducing head R can reproduce information from the magnetic recording medium M using the magneto-resistive effect.

In the reproducing head R, for example, a lower shield film 3, a gap insulating film 4, and an upper shield film 5 are stacked in the mentioned order. In the gap insulating film 4, a reproducing element S is embedded but exposed on the air bearing surface A.

The air bearing surface A is unambiguously defined with reference to one end face of the slider substrate 1 supporting a series of components from the insulating film 2 to the protective film 19.

Both the lower shield film 3 and the upper shield film 5 magnetically separate the reproducing element S from the surroundings and extend rearwardly from the air bearing surface A. The gap insulating film 4 electrically separates the reproducing element S from the surroundings, wherein the reproducing element S is a TMR element, for example.

The recording head W includes a main magnetic pole film 12, a return yoke film 18, a magnetic gap film 13, recording coils 17a, 17b, an auxiliary yoke film 11, insulating films 9, 10, and a height defining film 15.

The main magnetic pole film 12 is made of a ferromagnetic material and extends rearwardly from the air bearing surface A. The main magnetic pole film 12 has a recording medium facing surface that is of an inverted trapezoid shape, whose upper bottom and lower bottom are the longer side on the trailing side and the shorter side on the leading side, respectively. The upper side of the inverted trapezoid shape is a substantial recording portion of the main magnetic pole film 12, and its width, which defines the recording track width, is approximately 0.2 μm or less.

The return yoke film 18 functions to circulate the magnetic flux and is opposed to but spaced a given distance apart from the main magnetic pole film 12 at a front surface 18a, which is the recording medium facing surface, and connected to the main magnetic pole film 12 at a connection portion 18b behind it.

The magnetic gap film 13 is interposed between the return yoke film 18 and the main magnetic pole film 12 and made of, for example, a non-magnetic insulating material such as alumina or a non-magnetic conductive material such as ruthenium The recording coils 17a, 17b comprise upper and lower coils 17a, 17b and are made of, for example, highly conductive material such as copper (Cu) to produce a recording magnetic field $\phi$. The recording coils 17a, 17b are wound about the main magnetic pole film 12 and the auxiliary yoke film 11 and are both composed as a recording element. The recording coils 17a, 17b are formed on coil insulating foundation films 14, 7 and covered with coil insulating films 16, 8 such as of $Al_2O_3$.

The auxiliary yoke film 11 is formed of a magnetic material having a lower saturation magnetic flux density than the main magnetic pole film 12 and beneath the main magnetic pole film 12. The insulating films 9, 10 fill areas surrounding the main magnetic pole film 12 and the auxiliary yoke film 11. The height defining film 15 is formed on the magnetic gap film 13 at a position rearwardly spaced a given distance from the air bearing surface.

During the recording process, the magnetic head HD according to the present embodiment records information on the magnetic recording medium M such that a recording magnetic field $\phi$ is produced by letting a current from an external circuit flow through the recording coils 17a, 17b and discharged to the outside through the main magnetic pole film 12 to magnetize the magnetization film of the magnetic recording medium M. It should be noted that the discharged magnetic flux of the recording magnetic field $\phi$ is absorbed by the write shield film 17 and the return yoke film 20 and resupplied to the main magnetic pole film 12.

During the reproducing process, on the other hand, the magnetic head HD magnetically reproduces information recorded on the magnetic recording medium M such that as a sense current flows through the reproducing element S, the resistance of the reproducing element S changes in response to a reproducing signal magnetic field from the magnetic recording medium M and the change in resistance is detected as a voltage change.

In order to perform the recording and reproducing processes effectively, the magnetic head HD further includes a heater H and a resistive element Rs. The heater H and the resistive element Rs are individually embedded in a separating film 6, wherein the resistive element Rs is located closer to the air bearing surface A than the recording coils 17a, 17b, i.e., in front of the recording coils 17a, 17b, while the heater H is located behind the recording coils 17a, 17b. However, the heater H is not limited to this position and may be located at the same position as the recording coils 17a, 17b in the Y axis direction. The heater H and the resistive element Rs may be formed by using a sputtering process or the like.

Figure 3:
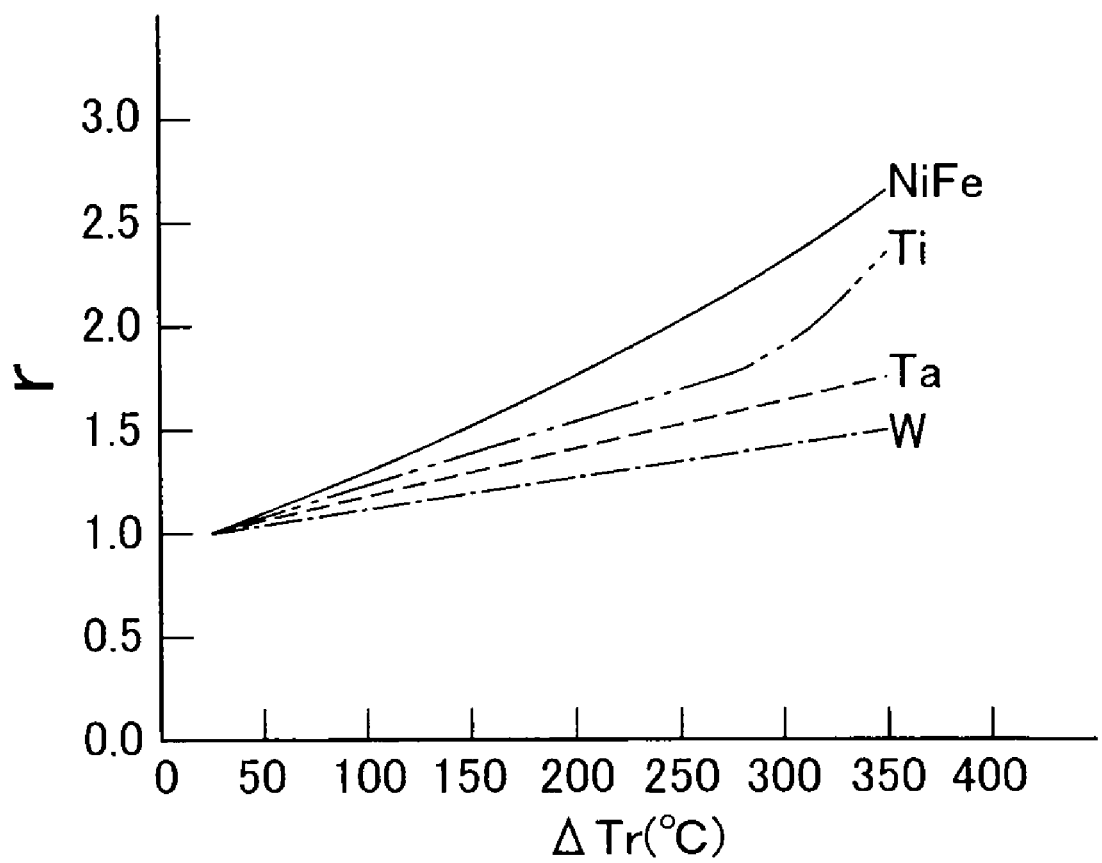
FIG. 3 is a diagram showing temperature characteristics of nickel-iron alloy, tantalum, and tungsten.

The resistive element Rs is a TA detection element whose resistance changes depending on temperature, and there may be adopted, for example, nickel-iron alloy (NiFe), titanium (Ti), tantalum (Ta) or tungsten (W) as a main component. In FIG. 3, those temperature characteristics are compared. It should be noted that the axis of ordinate indicates the temperature increase $\Delta Tr$ (° C.) and the axis of abscissa indicates the resistance change ratio r. It is seen from above that the nickel-iron alloy has the highest temperature coefficient, so that it is suitable for detecting TA with a high sensitivity. However, the resistive element Rs is not particularly limited and may have a negative temperature coefficient as long as having a sufficiently high temperature coefficient for detection. Thus, there are many options for adopting the resistive element Rs.

On the other hand, the heater H is a heat-generating resistor which generates heat when power is fed thereto so that the heat generation causes at least a part of the air bearing surface A to thermally expand and protrude (see the symbol A' in FIG. 2). This decreases the flying height of the magnetic head HD, i.e., the distance L between the air bearing surface A and the surface of the magnetic recording medium M (see the symbol L' in FIG. 2), thereby improving the recording performance of the recording head W and the reproducing performance of the reproducing head R.

Such a decrease in the distance L due to heating by the heater H improves the recording performance and the reproducing performance but increases the possibility of occurrence of TA due to collision against a ridge B on the surface of the magnetic recording medium M.

In the present invention, accordingly, the resistive element Rs is disposed closer to the air bearing surface A than the recording coils 17a, 17b, so that temperature change due to TA can be instantaneously and accurately detected at a position close to a collision position P on the air bearing surface A. If the resistive element Rs were disposed behind the recording coils 17a, 17b, it would require considerable time to conduct heat from the air bearing surface A to the resistive element Rs upon occurrence of TA, thereby not only taking much time for detection but also making it difficult to accurately detect TA because of the influence of heat conduction from the outside of the magnetic head HD.

Figure 4:
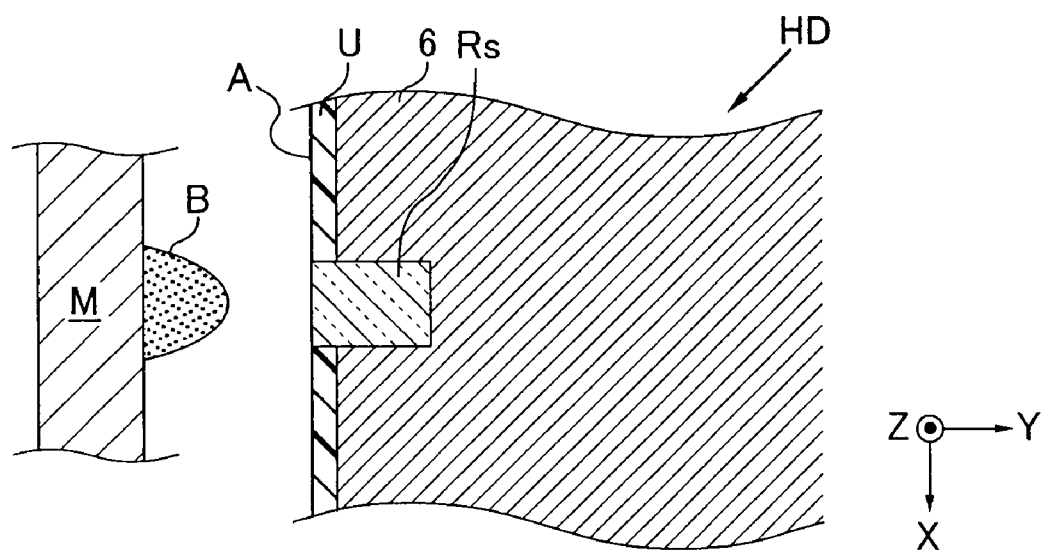
FIG. 4 is a section taken along line 4-4 in FIG. 2.

FIG. 4 is a section taken along line 4-4 in FIG. 2. In the present embodiment, the resistive element Rs is disposed with one end face exposed on the air bearing surface A and a lead U for energizing the resistive element Rs is similarly exposed on the air bearing surface A.

In this case, since the end face of the resistive element Rs is located on the air bearing surface A and the closest to the collision position P, there can be obtained the advantage that the temperature change can be easily detected, and in addition, since the lead U is located at the end of the separating film 6, there can be obtained the advantage that it can be easily formed. However, when TA occurs, the end face of the resistive element Rs or the lead U may directly contact the ridge B, so that in order to avoid this, it is required to dispose the resistive element Rs and the lead U behind the air bearing surface A.

Figure 5:
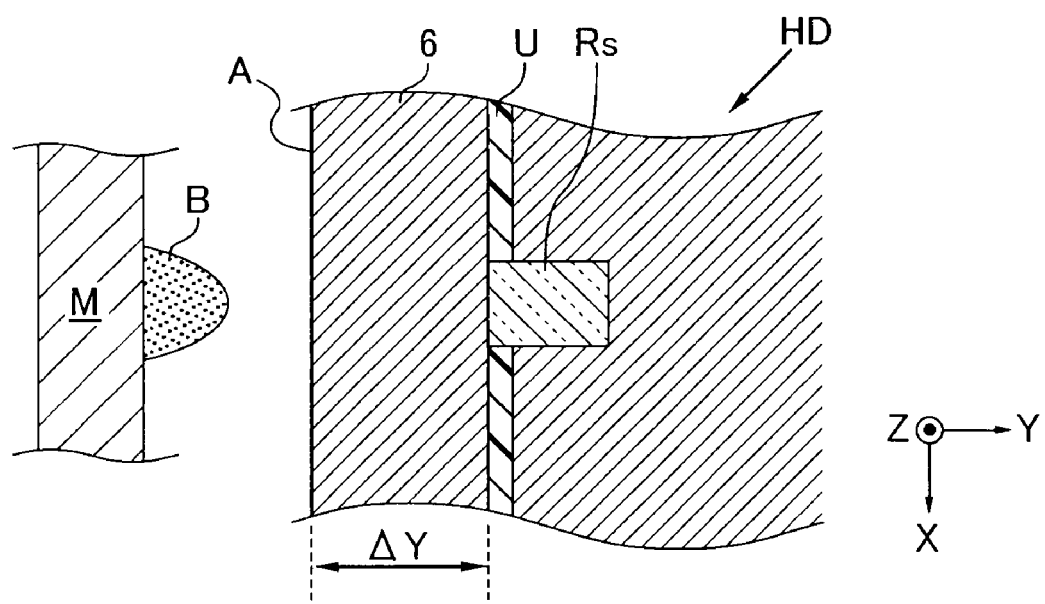
FIG. 5 is a diagram corresponding to FIG. 4, where a resistive element and a lead are located at a position rearwardly spaced a distance $\Delta Y$ (μm) from an air bearing surface.
Figure 6:
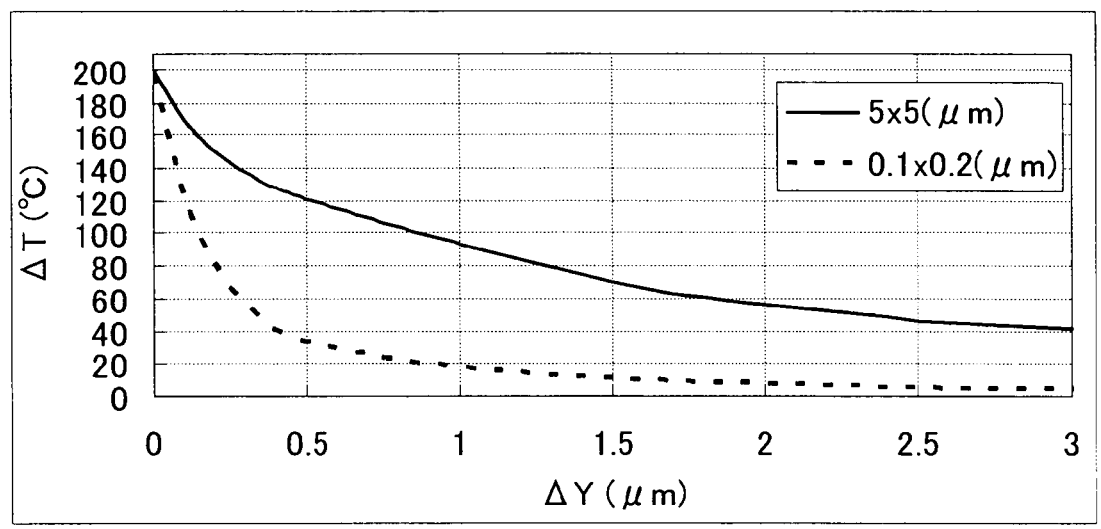
FIG. 6 is a diagram showing simulation results for characteristics of temperature change $\Delta T$ (° C.) due to TA with respect to the above distance $\Delta Y$ (μm).

FIG. 5 is a diagram corresponding to FIG. 4, where the resistive element Rs and the lead U are located at a position rearwardly spaced a distance $\Delta Y$ (µm) from the air bearing surface A. On the other hand, FIG. 6 is a diagram showing simulation results for characteristics of temperature change $\Delta T$ (° C.) due to TA with respect to the above distance $\Delta Y$ (µm). It should be noted that assuming that the contact face of the ridge B opposing the air bearing surface A is rectangular, FIG. 6 shows two cases: contact face of 5 (µm)×5 (µm); and contact face of 0.1 (µm)×0.2 (µm).

According to the experiment conducted by the inventors based on the above, it is found that considering the characteristics of temperature coefficient shown in FIG. 3, $\Delta Y \leq 2.0$ (µm) is appropriate for obtaining an optimum temperature change $\Delta T$ (° C.) for detection of TA with a sufficient sensitivity.

Figure 7:
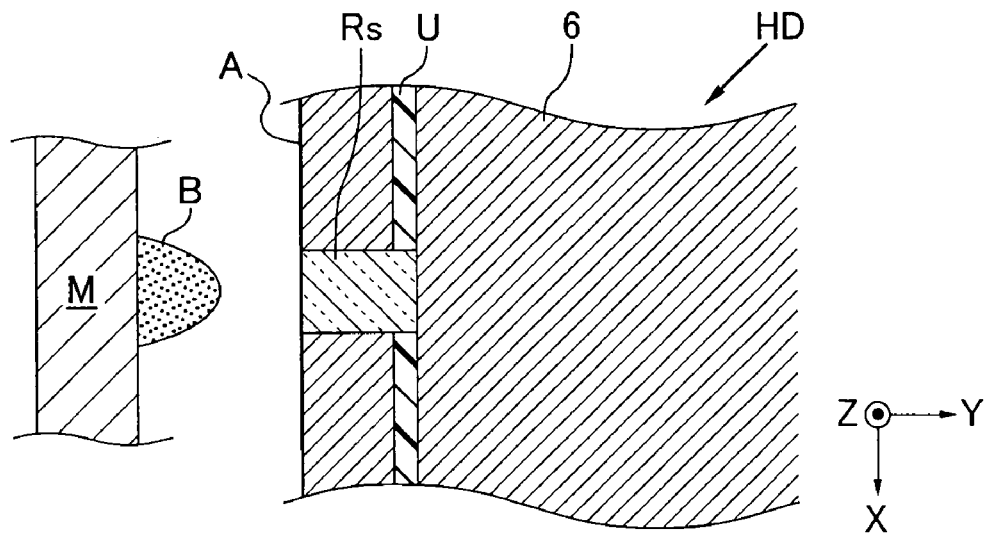
FIG. 7 is a diagram corresponding to FIG. 4, where a lead is located behind an air bearing surface.

It should be noted that the arrangement of the resistive element Rs and the lead U is not limited to the above. FIG. 7 is a diagram corresponding to FIG. 4, where the lead U is located behind the air bearing surface A. In this case, there is the advantage that collision between the lead U and the ridge B can be avoided.

Figure 8:
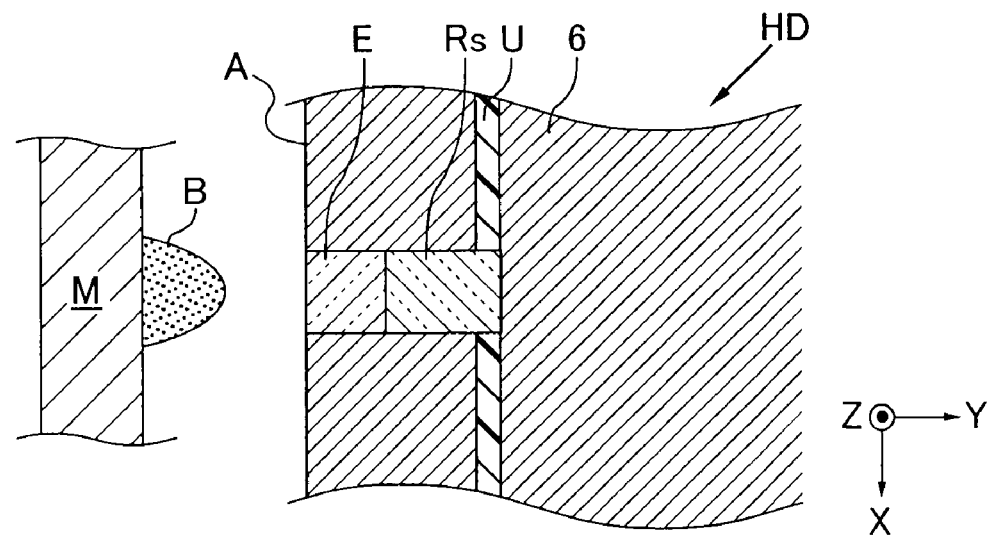
FIG. 8 is a diagram corresponding to FIG. 4, where a resistive element and a lead are located behind an air bearing surface and a heat-conducting member is disposed adjacent to and in front of the resistive element.

On the other hand, FIG. 8 is a diagram corresponding to FIG. 4, where the resistive element Rs and the lead U are located behind the air bearing surface A and a heat-conducting member E is disposed adjacent to and in front of the resistive element Rs. In this case, there can be obtained not only the advantage that collision of the resistive element Rs and the lead U against the ridge B can be avoided but also the advantage that the temperature change can be easily detected because the heat-conducting member E is exposed on the air bearing surface A to efficiently transmit the temperature change due to TA to the resistive element Rs. For the heat-conducting member E, for example, there may be adopted a material having a high thermal conductivity such as aluminum.

Moreover, since the above detection of TA is performed not by the reproducing element S but by the resistive element Rs, there is also obtained the advantage that the deterioration of the reproducing element S due to collision or heat conduction is prevented to improve reliability.

Figure 9:
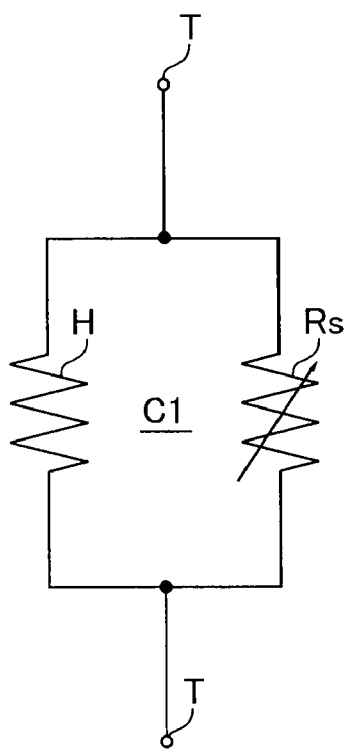
FIG. 9 is a diagram showing a resistive circuit connected in parallel.
Figure 10:
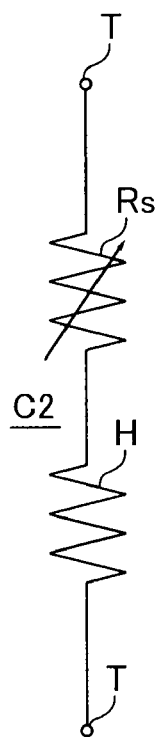
FIG. 10 is a diagram showing a resistive circuit connected in series.

The resistive element Rs is connected in series or in parallel with the heater H. FIG. 9 shows a resistive circuit C1 connected in parallel, while FIG. 10 shows a resistive circuit C2 connected in series. In both the circuits C1, C2, the resistive element Rs and the heater H are connected to common terminals T, so that when constituting a magnetic recording/reproducing apparatus, which will be described later, there can be obtained not only the effect that electrical connecting points can be commonly used for power feeding but also the effect that the wiring efficiency within the magnetic head HD can be increased to achieve miniaturization of the magnetic head HD.

With this magnetic head HD, as has been described hereinabove, since the resistive element Rs is disposed closer to the air bearing surface A, which is to be opposed to the magnetic medium M, than the recording coils 17a, 17b, TA can be instantaneously and accurately detected at a position close to the position P where collision against the ridge B of the magnetic medium M will occur. In addition, since the reproducing element S is not used for detection, it has not only high reliability but also broad options for the material because there is no limit to the temperature coefficient of the resistive element Rs.

Moreover, since the resistive element Rs is connected in series or in parallel with the heater H, power can be fed through a common wiring, which eliminates the waste of wiring and achieves miniaturization.

2. Head Assembly

Next will be described the head assembly according to the present invention. The head assembly according to the present invention includes the above magnetic head and a head support device. The head support device supports the magnetic head in such a manner as to permit rolling and pitching of the magnetic head. In the present invention, the head assembly includes an HGA (head gimbal assembly) in which the magnetic head is mounted on a head support device (gimbal) and an HAA (head arm assembly) in which the HGA is mounted on an arm.

Figure 11:
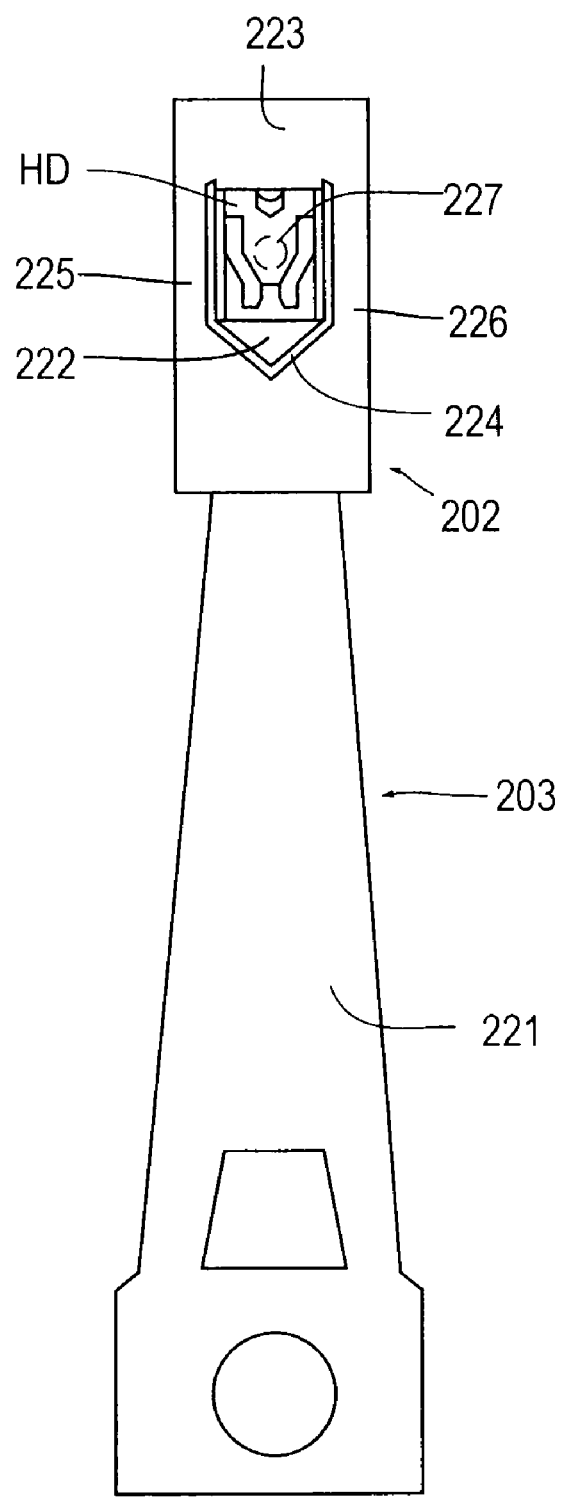
FIG. 11 is a plan view of an HGA according to the present invention.
Figure 12:
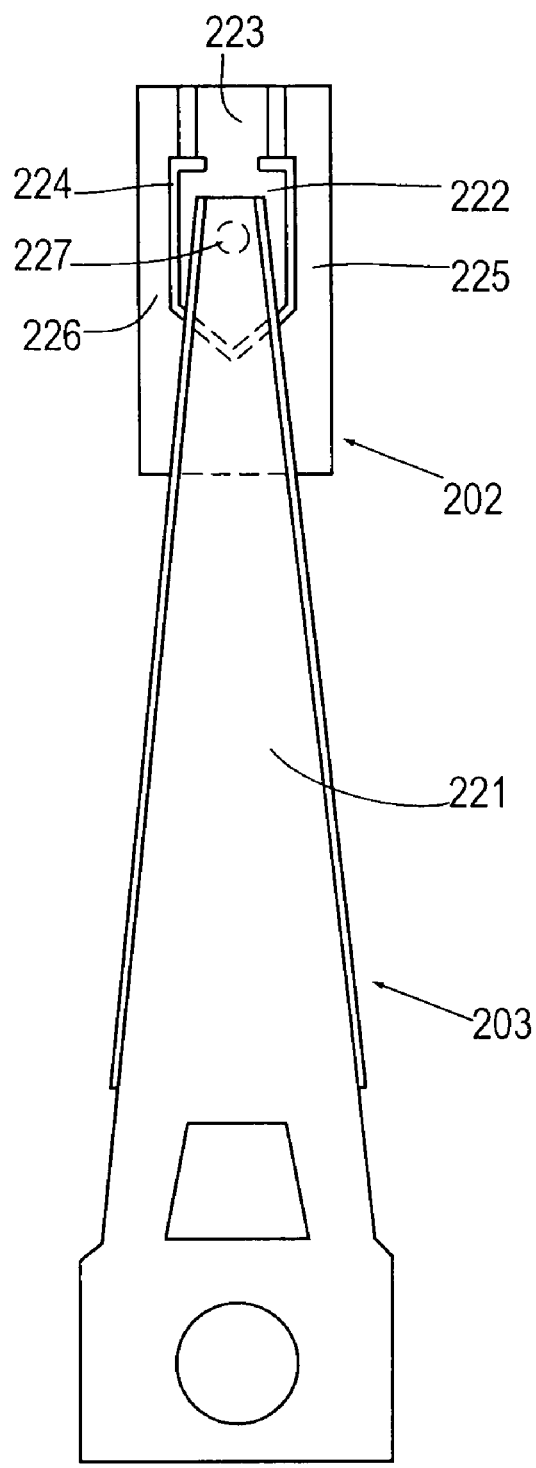
FIG. 12 is a bottom view of the HGA shown in FIG. 6.

FIG. 11 is a front view of the head assembly according to the present invention, and FIG. 12 is a bottom view of the head assembly shown in FIG. 11. The illustrated head assembly is an HGA and includes a suspension 203 and the magnetic head HD. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head HD is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the outer frame portions 225, 226 and the tongue portion 222, around the tongue portion 222. The magnetic head HD is attached to one side of the tongue portion 222 by means of an adhesive or the like and kept in spring contact with the tip of the load dimple 227.

One face of the magnetic head 228 opposite to the air bearing surface of the slider is attached to the tongue portion 222 of the suspension 203. Flexible leads and the like not shown in the drawings are connected to the magnetic head HD.

Figure 13:
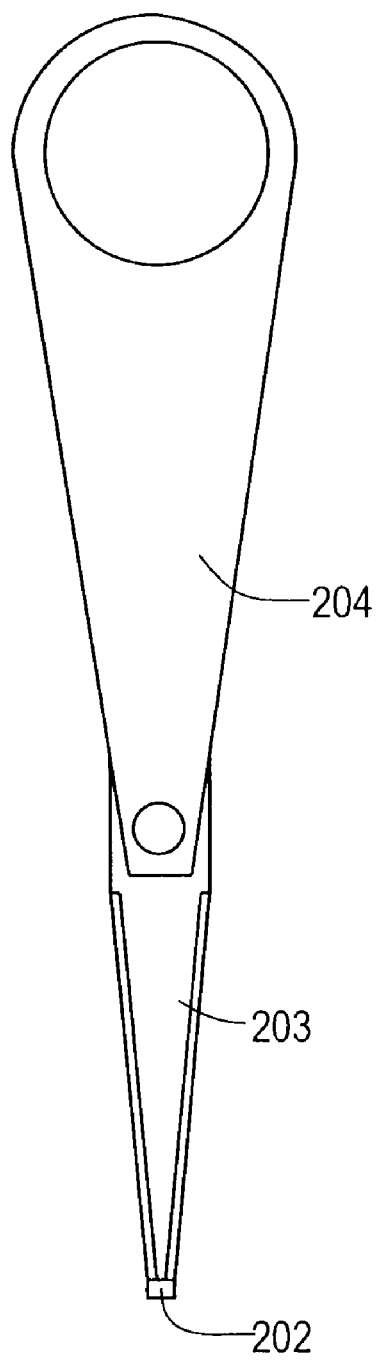
FIG. 13 is a plan view of an HAA according to the present invention.

FIG. 13 is a front view of an HAA. The illustrated HAA includes the suspension 203, the magnetic head HD and an arm 204. The arm 204 is integrally formed of a suitable non-magnetic metallic material such as an aluminium alloy. The arm 204 is provided with a mounting hole. The mounting hole is used for mounting on a positioning device provided in a magnetic disk apparatus. One end of the suspension 203 is secured to the arm 204, for example, with a ball connecting structure.

With this head assembly including the magnetic head according to the present invention, there can be obtained the same effect as described above.

3. Magnetic Recording/Reproducing Apparatus

Figure 14:
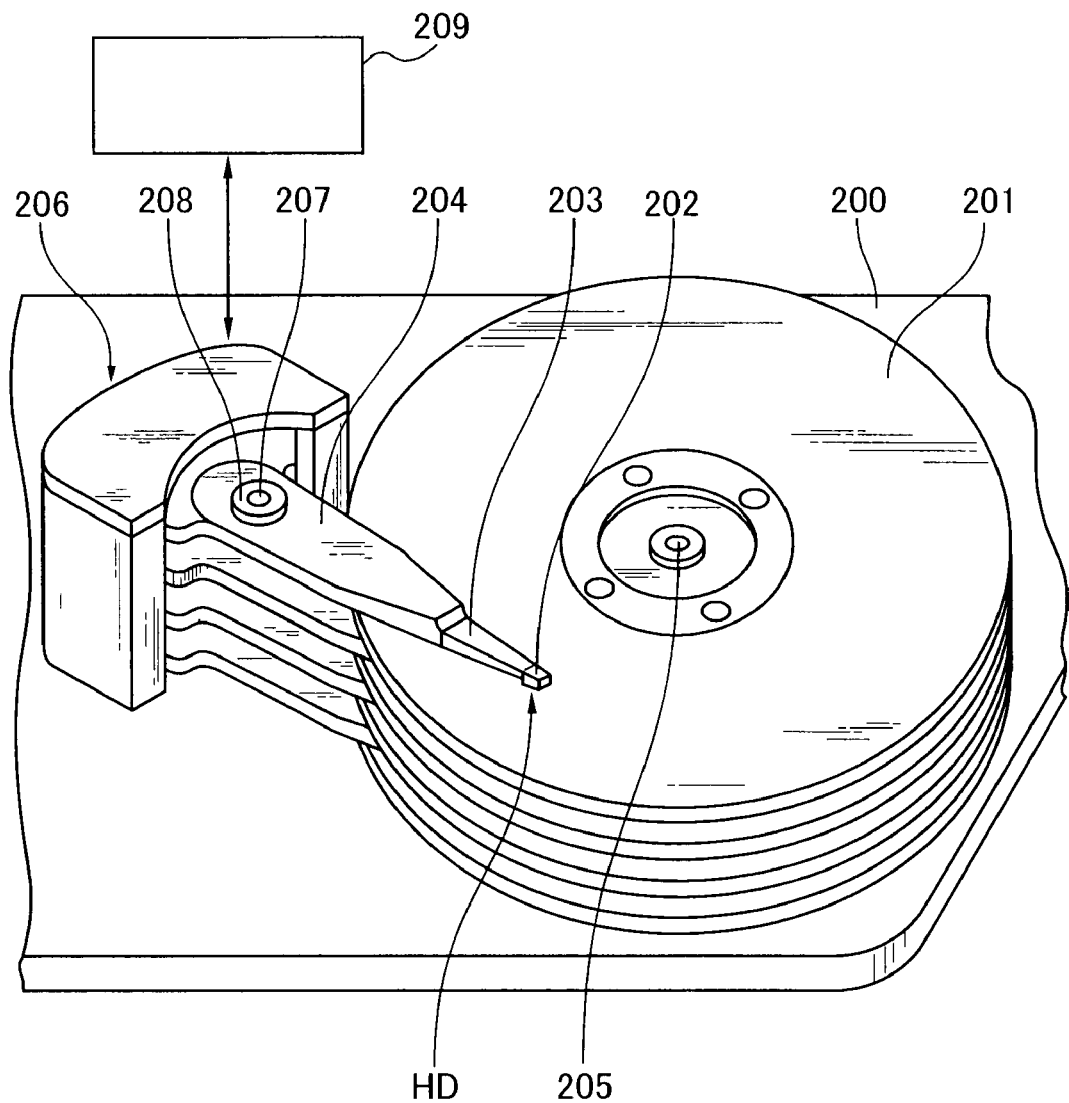
FIG. 14 is a perspective view of a magnetic recording/reproducing apparatus according to the present invention.

Finally the magnetic recording/reproducing apparatus according to the present invention will be described. FIG. 14 is a perspective view of the magnetic recording/reproducing apparatus. In FIG. 14, a case 200 is shown in a partially cut-away state so that the internal structure of the apparatus can be easily seen.

The magnetic recording/reproducing apparatus carries the above head assembly, and in the present embodiment, a hard disk drive is taken as an example for explanation. The magnetic recording/reproducing apparatus includes, within the case 200, a plurality of magnetic disks (i.e., hard disks) 201 corresponding to the magnetic recording medium M for magnetically recording information, a plurality of suspensions 203 disposed corresponding to the respective magnetic disks 201 and supporting the magnetic heads HD at their one ends, and a plurality of arms 204 supporting the other ends of the suspensions 203.

When the magnetic disk 201 rotates for recording or reproducing information, an air flow generated between the recording surface (magnetic head-facing surface) of the magnetic disk 201 and the air bearing surface 70 is utilized to let the magnetic head HD take off from the recording surface of the magnetic disk 201.

The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200. The actuator 206 is constructed to include, for example, a driving source such as a voice coil motor.

With the head assembly including the magnetic head HD according to the present invention, as has been described hereinabove, this magnetic recording/reproducing apparatus can record information by applying a recording magnetic field to the magnetic disk 201 and reproduce information from the magnetic disk 201.

The magnetic recording/reproducing apparatus is further provided with a circuit board of a signal processing circuit 209 in order to control recording and reproducing. The signal processing circuit 209 is electrically connected to the magnetic head HD.

Figure 15:
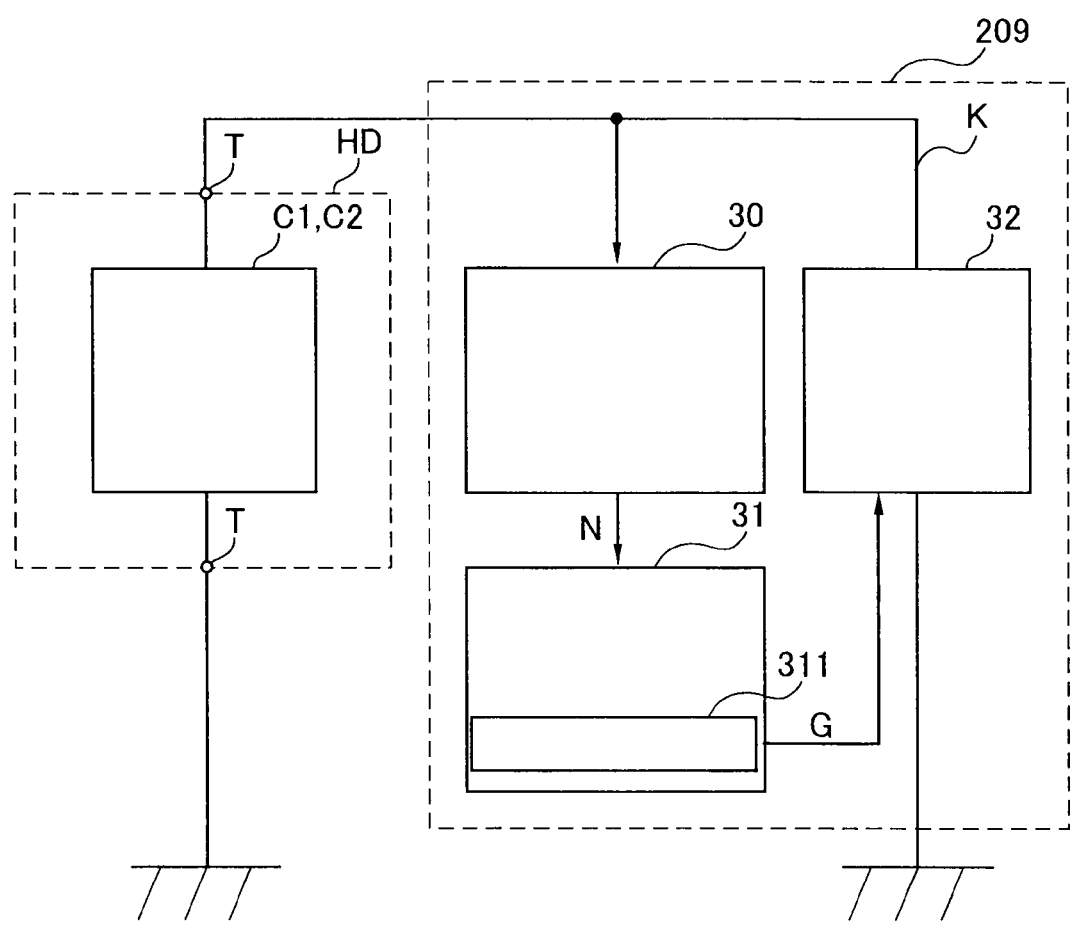
FIG. 15 is a circuit block diagram showing connection between a signal processing circuit and a resistive circuit of a magnetic head.

FIG. 15 is a circuit block diagram showing connection between the signal processing circuit 209 and the resistive circuits C1, C2 of the above magnetic head HD. In the signal processing circuit 209, however, only a circuit block relating to the present invention is shown in a limited way. It should be noted that the resistive circuits C1, C2 are electrically connected to the signal processing circuit 209 via the above terminals T.

The signal processing circuit 209 includes a TA detection circuit 30, a hard disk controller 31, and a power circuit 32. The power circuit 32 is, for example, a DC-DC converter and feeds power to the resistive circuits C1, C2 via a power feeding line K. This energizes the heater H to heat the magnetic head HD.

The TA detection circuit 30 is composed of a low-pass filter circuit or the like and connected to the power feeding line K. The TA detection circuit 30 detects TA based on the change in resistance of the resistive element Rs. If TA is detected, the TA detection circuit 30 sends a TA detection signal N to the hard disk controller 31.

The hard disk controller 31 is a controller provided with a logic circuit, for example, a recording control circuit and a reproducing control circuit and connected to the TA detection circuit 30. Based on the TA detection signal N, the hard disk controller 31 records the position where TA has occurred on the magnetic disk 201, i.e., the position of the ridge B shown in FIG. 2, into memory or the like as a defective part and controls such that the defective part will not be processed upon recording, reproducing or seeking. Thus, the magnetic recording/reproducing apparatus according to the present embodiment can effectively avoid TA.

In order to obtain the same effect, it is also possible to provide the hard disk controller 31 with a flying height controller 311, in place of the above function. When receiving the TA detection signal N, the flying height controller 311, which is connected to the TA detection circuit 30 and the power circuit 32, sends a control signal G to the power circuit 32 so as to increase the flying height.

When receiving the control signal G, the power circuit 32 decreases the output current. This suppresses not only the calorific value of the heater H but also the above thermal expansion. Thus, the flying height of the magnetic head HD increases to prevent the collision against the ridge B, effectively avoiding TA.

With this magnetic recording/reproducing apparatus including the magnetic head and the head assembly according to the present invention, there can be obtained the same effects as described above.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising:
a heat-generating resistor;
a recording coil; and
a resistive element,
wherein the magnetic head has an air bearing surface,
wherein said heat-generating resistor is configured to generate heat when power is fed thereto so that the heat generation causes at least a part of said air bearing surface to thermally expand and protrude,
wherein said recording coil is configured to generate a recording magnetic field,
wherein said resistive element is disposed closer to said air bearing surface than said recording coil as a whole and connected in series or in parallel with said heat-generating resistor and is a thermal asperity detection element whose resistance changes depending on temperature, and
wherein the heat-generating resistor and the resistive element are embedded in a same film.

2. The magnetic head as claimed in claim 1, wherein said resistive element contains nickel-iron alloy as a main component.

3. The magnetic head as claimed in claim 1, further comprising a reproducing element and a recording element, wherein
said reproducing element is a TMR element, and said recording element includes said recording coil.

4. The magnetic head as claimed in claim 1, wherein a distance between said resistive element and said air bearing surface is equal to or less than 2.0 (μm).

5. The magnetic head as claimed in claim 1, wherein said resistive element is disposed with one end face exposed on the air bearing surface.

6. The magnetic head as claimed in claim 1, wherein the resistive element is located at a position rearwardly spaced a distance from the air bearing surface.

7. The magnetic head as claimed in claim 1, wherein the resistive element is located behind the air bearing surface and a heat-conducting member is disposed adjacent to and in front of the resistive element.

8. A head assembly comprising:
a magnetic head; and
a head support device,
wherein said magnetic head comprises a heat-generating resistor, a recording coil, and a resistive element and has an air bearing surface,
wherein said heat-generating resistor is configured to generate heat when power is fed thereto so that the heat generation causes at least a part of said air bearing surface to thermally expand and protrude,
wherein said recording coil is configured to generate a recording magnetic field,
wherein said resistive element is disposed closer to said air bearing surface than said recording coil as a whole and connected in series or in parallel with said heat-generating resistor and is a thermal asperity detection element whose resistance changes depending on temperature,
wherein the heat-generating resistor and the resistive element are embedded in a same film, and
wherein said head support device is configured to support said magnetic head in such a manner as to permit rolling and pitching of said magnetic head.

9. A magnetic recording/reproducing apparatus comprising:
a head assembly; and
a magnetic recording medium,
wherein said head assembly comprises a magnetic head, and a head support device,
wherein said magnetic head comprises a heat-generating resistor, a recording coil, and a resistive element and has an air bearing surface,
wherein said heat-generating resistor is configured to generate heat when power is fed thereto so that the heat generation causes at least apart of said air bearing surface to thermally expand and protrude,
wherein said recording coil is configured to generate a recording magnetic field,
wherein said resistive element is disposed closer to said air bearing surface than said recording coil as a whole and connected in series or in parallel with said heat-generating resistor and is a thermal asperity detection element whose resistance changes depending on temperature,
wherein the heat-generating resistor and the resistive element are embedded in a same film,
wherein said head support device is configured to support said magnetic head in such a manner as to permit rolling and pitching of said magnetic head, and
wherein said head assembly is configured to record information by applying a recording magnetic field to said magnetic recording medium and reproduce information from said magnetic recording medium.

10. The magnetic recording/reproducing apparatus as claimed in claim 9, further comprising a detection circuit, wherein said detection circuit is electrically connected to said resistive element and adapted to detect thermal asperity based on change in resistance of said resistive element.

11. The magnetic recording/reproducing apparatus as claimed in claim 9, further comprising a power circuit, wherein said power circuit is adapted to feed power to said heat-generating resistor and said resistive element.

* * * * *